W. TUTTLE.
Harrow.
No. 101,547.
Patented April 5, 1870.
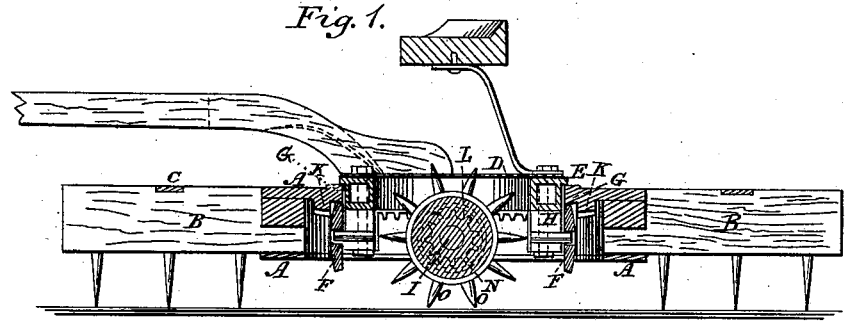
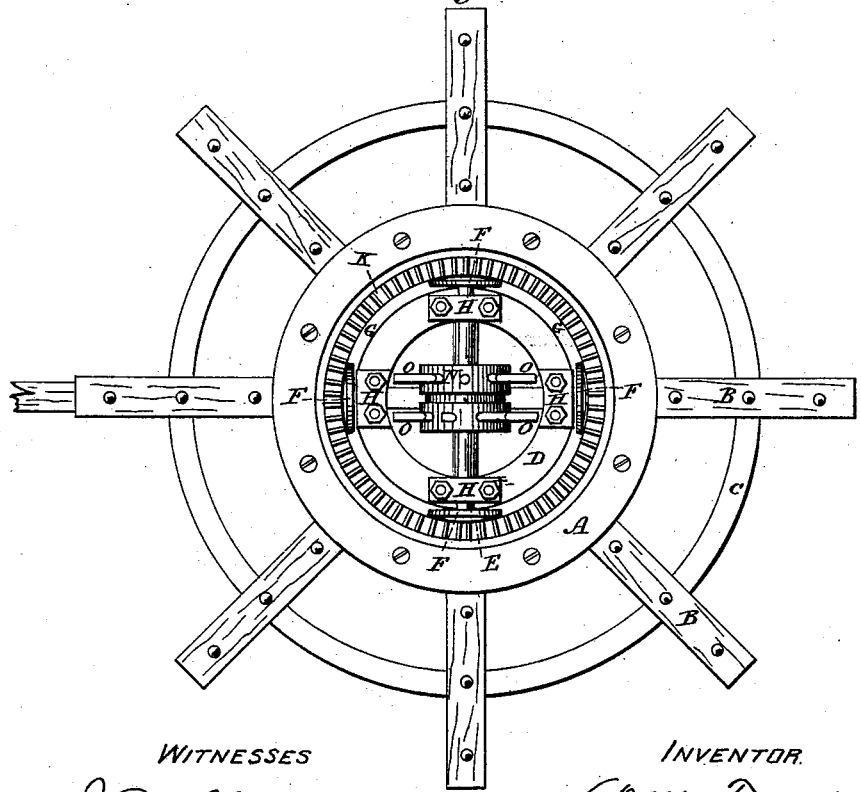
WITNESSES
INVENTOR.

United States Patent Office.

WILLIAM TUTTLE, OF FAYETTE, MISSISSIPPI.

Letters Patent No. 101,547, dated April 5, 1870.

IMPROVEMENT IN HARROWS.

The Schedule referred to in these Letters Patent and making part of the same.

*To all whom it may concern:*

Be it known that I, MR. WILLIAM TUTTLE, of Fayette, in the county of Jefferson and State of Mississippi, have invented a new and useful Improvement in Harrows; and I do hereby declare that the following is a full, clear, and exact description thereof, which will enable others skilled in the art to make and use the same, reference being had to the accompanying drawings forming part of this specification.

This invention relates to that class of harrows which is made to rotate horizontally; and The invention consists in the combination and construction of parts as hereinafter specified.

Figure 1 represents a transverse section of my improved harrow, and

Figure 2 represents a plan of the bottom of the same.

The frame of the revolving part of the harrow consists of the circular rim A, the radiating arms B, and the rim C.

D is the draft-ring or frame, which is connected to the rim A by a projecting flange, E, lapping the rim A at the top, and friction-rollers F, taking under and rolling against a bevel flange, G, on the rim A. Two of these rollers are supported on studs projecting from blocks H, connected to the under side of the ring D, and the other two are connected to a shaft, I, supported also in blocks H. The faces of these rollers are beveled to correspond with the rim or flange G.

The rim A is provided with a toothed rim, K, on its under side, adjoining the flange G, and the shaft I has a toothed wheel, L, at one end, gearing with the said toothed rim.

This shaft I carries a drum, N, provided with spikes O, working in contact with the ground.

The oscillation of the harrow on the draft-ring D, caused by the unequal action on the ground, imparts rotary motion to the shaft I and toothed drum N, which, moving rapidly, breaks and pulverizes the turf and lumps very effectually.

The friction-wheel F, at the end of the shaft I, opposite the pinion, works loosely on the said shaft to avoid rubbing on the flange G, the motion of which is opposite to that the roller would have if keyed fast to the shaft.

Having thus described my invention,

I claim as new and desire to secure by Letters Patent—

The combination and arrangement of the draft-ring D, having the propelling flange E, the toothed and beveled flange of the rim A, the friction-rollers F, pin L, and toothed drum, all substantially as specified.

MR. WM. TUTTLE.

Witnesses:
J. W. BURCH,
J. M. McCALEB.